United States Patent
Sezerman et al.

(10) Patent No.: US 10,329,196 B2
(45) Date of Patent: Jun. 25, 2019

(54) METHOD FOR THE FABRICATION OF OPTICAL WAVEGUIDE DEVICES IN PHOTONIC CRYSTAL FIBERS AND IN WAVEGUIDES WITH HOLLOW STRUCTURES

(71) Applicant: OZ OPTICS, LTD., Ottawa (CA)

(72) Inventors: Omur Sezerman, Kanata (CA); Luis Andre Fernandes, Ottawa (CA); Garland Best, Almonte (CA); Mi Li Ng, Ottawa (CA); Saidou Kane, Ottawa (CA)

(73) Assignee: OZ OPTICS LTD., Ottawa, Ontario (CA)

( * ) Notice: Subject to any disclaimer, the term of this patent is extended or adjusted under 35 U.S.C. 154(b) by 320 days.

(21) Appl. No.: 15/210,047

(22) Filed: Jul. 14, 2016

(65) Prior Publication Data

US 2017/0015585 A1   Jan. 19, 2017

(51) Int. Cl.

| | |
|---|---|
| *C03B 37/012* | (2006.01) |
| *C03C 25/6208* | (2018.01) |
| *G02B 6/02* | (2006.01) |
| *C03B 37/15* | (2006.01) |
| *B23K 26/53* | (2014.01) |
| *B23K 26/60* | (2014.01) |
| *G02B 6/28* | (2006.01) |
| *G02B 6/255* | (2006.01) |

(52) U.S. Cl.
CPC .......... *C03C 25/6208* (2018.01); *B23K 26/53* (2015.10); *B23K 26/60* (2015.10); *C03B 37/15* (2013.01); *G02B 6/02309* (2013.01); *G02B 6/2852* (2013.01); *G02B 6/02147* (2013.01); *G02B 6/02314* (2013.01); *G02B 6/02323* (2013.01); *G02B 6/2552* (2013.01)

(58) Field of Classification Search
None
See application file for complete search history.

(56) References Cited

U.S. PATENT DOCUMENTS

| 3,932,162 A | * | 1/1976 | Blankenship | ..... C03B 37/01211 |
| | | | | 65/421 |
| 4,630,889 A | * | 12/1986 | Hicks, Jr. | ............... C03B 37/027 |
| | | | | 385/11 |
| 7,095,931 B2 | * | 8/2006 | Sezerman | ........... C03C 23/0025 |
| | | | | 385/123 |

(Continued)

FOREIGN PATENT DOCUMENTS

| WO | 2004013668 A2 | 2/2004 |
| WO | 2008014357 A2 | 1/2008 |

OTHER PUBLICATIONS

EP16179392, Search Report, dated Nov. 8, 2016; 6 pages.

*Primary Examiner* — Cynthia Szewczyk
(74) *Attorney, Agent, or Firm* — Beusse, Wolter, Sanks & Maire PLLC; Robert L. Wolter

(57) ABSTRACT

There is provided a method to fabricate optical taps and waveguide devices in photonic crystal fibers and other fibers with hollow structures. The method involves a preparation step, where the hollow holes inside the fiber are collapsed or partially modified locally; and a waveguide fabrication step, where a femtosecond laser is focused inside the fiber and used to produce optical waveguides that interact in the region that was previously modified in the preparation step.

4 Claims, 2 Drawing Sheets

(56) References Cited

U.S. PATENT DOCUMENTS

| | | |
|---|---|---|
| 7,295,731 B2 | 11/2007 | Sezerman et al. |
| 2004/0175084 A1* | 9/2004 | Broeng ............. C03B 37/01217 385/125 |
| 2007/0201802 A1 | 8/2007 | Mihailov et al. |
| 2009/0052849 A1* | 2/2009 | Lee ...................... A61B 5/0084 385/119 |

* cited by examiner

METHOD FOR THE FABRICATION OF OPTICAL WAVEGUIDE DEVICES IN PHOTONIC CRYSTAL FIBERS AND IN WAVEGUIDES WITH HOLLOW STRUCTURES

CROSS REFERENCE TO RELATED APPLICATIONS

The present application claims priority to Canadian Application No. 2,897,130 filed Jul. 14, 2015, the content of which is incorporated by reference in its entirety.

TECHNICAL FIELD

The present invention relates to the fabrication of optical waveguides inside photonic crystal optical fibers and in waveguides with hollow structures using focused femtosecond laser radiation and fiber fusion by heating.

BACKGROUND OF THE INVENTION

Co-owned U.S. Pat. No. 7,295,731 B2 describes a method for using femtosecond laser radiation for the creation of optical waveguiding devices inside standard optical fibers. The femtosecond laser is focused inside the optical fiber and the intense light generated in the focal region produces non-linear absorption in the glass fiber and creates permanent refractive index changes. The different refractive index regions can be used to produce waveguide vias for light to travel, thus functionalizing the fiber for applications beyond their original intent. For example, these waveguides can be made to interact with the fiber core and allow light to be coupled from the core to the fiber cladding. This technique can be used to form applications such as local light tapping for power monitoring, cladding waveguides for sensing, periodic structures such as Bragg grating for light filters, and others.

Photonic crystal fibers have been established for years and they confine and guide light, not by having a core with a positive index difference to its surroundings, but instead by creating a light band gap, with subsequent confinement, around the center of the fiber by means of strategically positioned hollow (usually air filled) holes. The band gap structure guides the light in the center of the fiber, typically a solid core with a material that is the same as the material composing the rest of the solid portions of the fiber (typically fused silica/quartz glass). However, in certain configurations, the core itself may also be formed by a hollow hole and still guide the light in its center. Other types of fibers such as suspended core fibers also utilize hollow structure to form a cladding surrounding a solid core. In this case, the hollow areas are typically larger than the core itself and are connected by thin solid bridges that hold the structure together.

The hollow holes in all these types of fibers, with their very low refractive index when compared to glass fiber, are fundamental to the creation of a photonic band gap and to the working principle of this class of light waveguides. However these structures also present a challenge for the fabrication of waveguides with femtosecond lasers. Since there is no material to be modified inside those holes, the methods that form the current state of the art are not adequate and the introduction of other non-obvious elements to the fabrication procedures are required in order to have a means to achieve the same potential for the local creation of devices as is currently possible in standard optical fibers with femtosecond laser writing.

SUMMARY

In one aspect of the present invention is a method of pre-modification of a photonic crystal fiber (PCF) in order to create local disruption in the band gap core and allow for the coupling of waveguide devices from the fiber core to the fiber cladding using the femtosecond laser fabrication method. This local pre-modification can be accomplished, for example, by using a finely tuned source of heat, such as electrical arc discharge, to locally collapse the hollow holes in a small region of the PCF. Fine control is recommendable in order to obtain a disruption in the fiber large enough to enable efficient coupling to waveguides in the cladding but small enough to avoid complete destruction of the fiber itself or otherwise create significantly higher losses that would defeat the original device purpose or render the device unusable.

In accordance with one aspect of the present invention there is provided a method for making a femtosecond laser fabricated waveguide to couple light from a core of an optical fiber to a cladding of the optical fiber, the method comprising the steps of a preparation step in which the optical fiber is heated in a localized region to modify a region of the core within the localized region and a waveguide fabrication step in which a femtosecond laser is focused inside the optical fiber in order to define a waveguide that interacts with the modified core region.

BRIEF DESCRIPTION OF THE DRAWINGS

The invention will be further understood from the following description with reference to the attached drawings.

DESCRIPTION OF THE PREFERRED EMBODIMENTS

One embodiment of the present invention consists of a method to couple light from the core of a photonic crystal optical fiber. or other waveguide device with hollow structure, to its cladding in order to use that light for any purpose leading to the fabrication of a functional optical device. A femtosecond laser can be used to produce a region of modified index of refraction that forms a waveguide. However, that index modified region is not sufficient when the principle operation of the fiber is a photonic band gap that has the fiber core surrounded by hollow (air filled) elements, as such regions remain unaffected by the femtosecond laser writing system. In order to locally disturb the fiber core light confinement, one aspect of the present method includes a preparation step that selectively heats, and partially or completely collapses the hollow structures, opening the way for femtosecond written waveguides to couple light from the fiber core into the cladding or to escape into free space at the edge of the fiber.

In one aspect of the present invention, an electrical fusion arc (pulsed or continuous) is used to accomplish localized heating, for example in a polarization maintaining, endless single mode, large mode area, photonic crystal fiber. Other methods can be use to the same extent as long as they provide enough localization and enough fine control for the modification to be small, reliable, and produce no more disturbances to the fiber core as necessary for the requirements of a particular device. For example, in an alternative method, laser radiation (femtosecond or otherwise) is used. The localized and fine controllable nature of laser radiation offers an alternative for the electrical fusion arc. The parameters and properties of such an approach may be different than the properties needed for femtosecond laser radiation to produce waveguide devices in the fiber. For example, higher pulse energies, longer pulse duration, and longer exposure times (low peak power regime) may be appropriate to partially collapse the hollow structure while subsequently lower pulse energies and lower pulse durations (high peak power regime) may be used to inscribe the waveguide in the heat affected zone left behind.

Figure 1A:
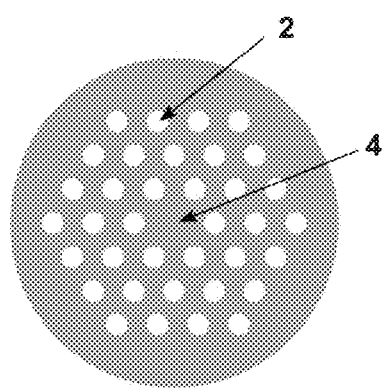
FIG. 1 shows typical geometries of photonic crystal fibers, both single mode (FIG. 1A) and polarization maintaining (FIG. 1B).
Figure 1B:
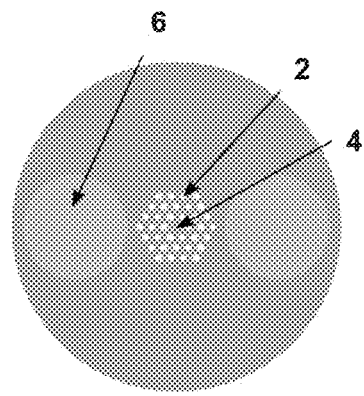

FIG. 1A shows the air holes 2 and fiber core 4 of a representative diagram of the end facet view of a photonic crystal fiber. FIG. 1B shows the polarization maintaining stress rods 6, air holes 2 and fiber core 4 of a representative diagram of the end facet view of a polarization maintaining photonic crystal fiber. These geometries are representative examples of the target application of the present invention, however the range of fibers of application of the present method are not limited to the configurations represented here but extend to any fiber to which the operating principle is the creation of a photonic band gap or any other type of mode confinement by the use of hollow elements. The present method is also not limited to any particular shape or arrangement of the hollow holes, but can be applied to any shape or arrangement with little modification.

Figure 2A:
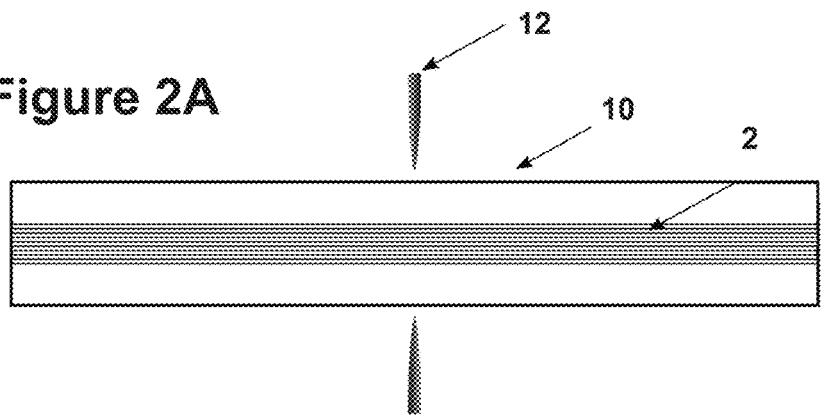
FIGS. 2A to 2D are a representation of the general steps involved in the present method for the fabrication of optical waveguide devices with hollow structures.
Figure 2B:
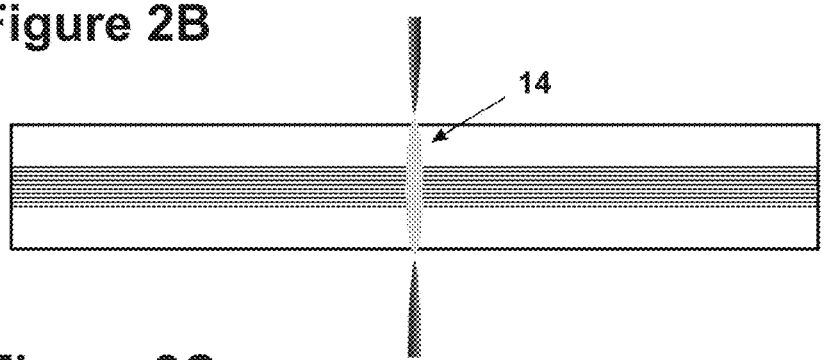
Figure 2C:
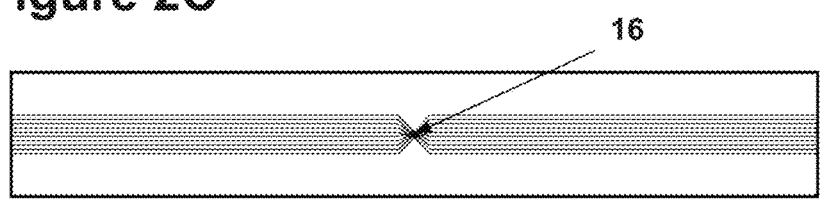
Figure 2D:
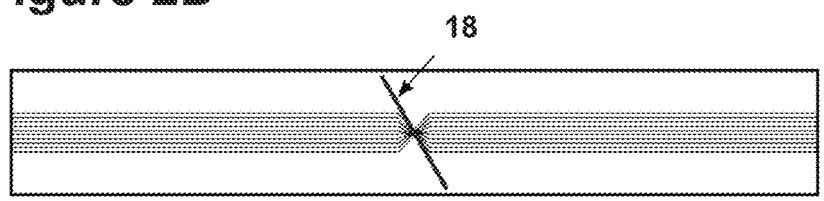

FIGS. 2A to 2D show a diagram of the fabrication steps to obtain efficient coupling between the fiber core and the cladding in a hollow structure waveguide. FIG. 2A shows a side view of a photonic crystal fiber 10, with the arc discharge needle 12 above and air holes 2 within. FIG. 2B shows a localized electric arc discharge 14. FIG. 2C then shows the subsequent collapsed holes region 16. FIG. 2D shows a femtosecond fabricated waveguide 18 crossing the core into the outer volume of the fiber.

Exemplary steps illustrated by FIG. 2 involve starting from a photonic crystal fiber 10 in FIG. 2A in which a central section is locally heated by any method including, but not limited to, electrical fusion arc, shown in FIG. 2B. This heating facilitates the local collapse of the hollow holes, as shown in FIG. 2C. The heat-modified region is then processed with femtosecond laser radiation in order to fabricate a waveguide, shown in FIG. 2D, that permits the coupling of light from the core to the cladding for the purposes of light tapping and monitoring or others.

One example of employing electrical fusion arc to heat the fiber is by using a Fujikura™ FSM-100P+ fiber fusion splicer. A second example of another suitable splicer is a Fujikura™ LMZ-100 laser splicing system. Any such similar commercially available programmable electric arc fusion splicers can be used.

It will be appreciated by one skilled in the art that variants can exist in the above-described arrangements and applications. The specific examples provided herein relate to a means of modifying a fiber in order to facilitate the local collapse of hollow holes, opening the way for femtosecond written waveguides to couple light from the fiber core into the cladding or to escape into free space at the edge of the fiber; however, the materials, methods of application and arrangements of the invention can be applied to other similar fibers using other similar heating methods.

The scope of the claims should not be limited by the preferred embodiments set forth in the examples, but should be given the broadest interpretation consistent with the description as a whole.

What is claimed is:

1. A method for making a femtosecond laser fabricated waveguide to couple light from a core of a photonic crystal fiber to a cladding of the photonic crystal fiber, the method comprising the steps of:
   a preparation step in which the photonic crystal fiber is heated in a localized region to modify a region of the core within the localized region; and
   a waveguide fabrication step in which a femtosecond laser is focused inside the photonic crystal fiber in order to define a waveguide that interacts with the modified core region;
   wherein the preparation step modifies the region by producing a partial or complete collapse of a hollow structure surrounding the core within the localized region.

2. The method of claim 1 wherein the preparation step uses electrical arc discharge to heat the localized region.

3. The method of claim 1 wherein the preparation step uses laser radiation to heat the localized region.

4. The method of claim 1 wherein the cladding of the hollow structure of the photonic crystal fiber surrounding the core has one or more radii that is larger than the diameter core.

* * * * *

UNITED STATES PATENT AND TRADEMARK OFFICE
CERTIFICATE OF CORRECTION

PATENT NO. : 10,329,196 B2
APPLICATION NO. : 15/210047
DATED : June 25, 2019
INVENTOR(S) : Omur Sezerman et al.

It is certified that error appears in the above-identified patent and that said Letters Patent is hereby corrected as shown below:

On the Title Page

Under item (30) "Foreign Application Priority Data" please insert -- Jul. 14, 2015 (CA)............CA 2897130 --

Signed and Sealed this
Fifteenth Day of November, 2022

Katherine Kelly Vidal
*Director of the United States Patent and Trademark Office*